Jan. 11, 1966     M. E. FULTON ETAL     3,228,283
CAMERA ASSEMBLY
Filed July 11, 1961     2 Sheets-Sheet 1
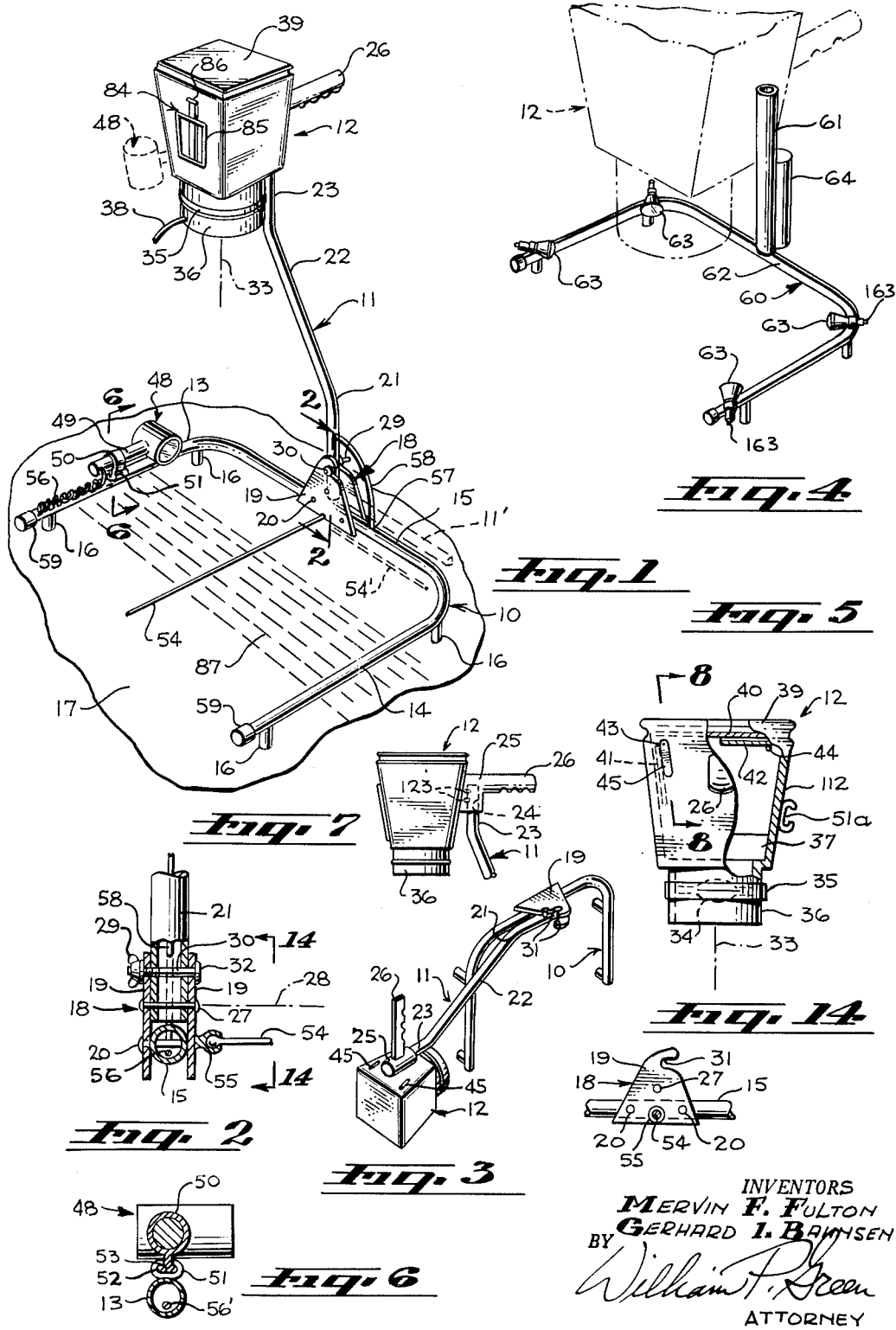
INVENTORS
MERVIN F. FULTON
GERHARD I. BAHNSEN
BY William P. Green
ATTORNEY Jan. 11, 1966 M. E. FULTON ETAL 3,228,283
CAMERA ASSEMBLY
Filed July 11, 1961 2 Sheets-Sheet 2
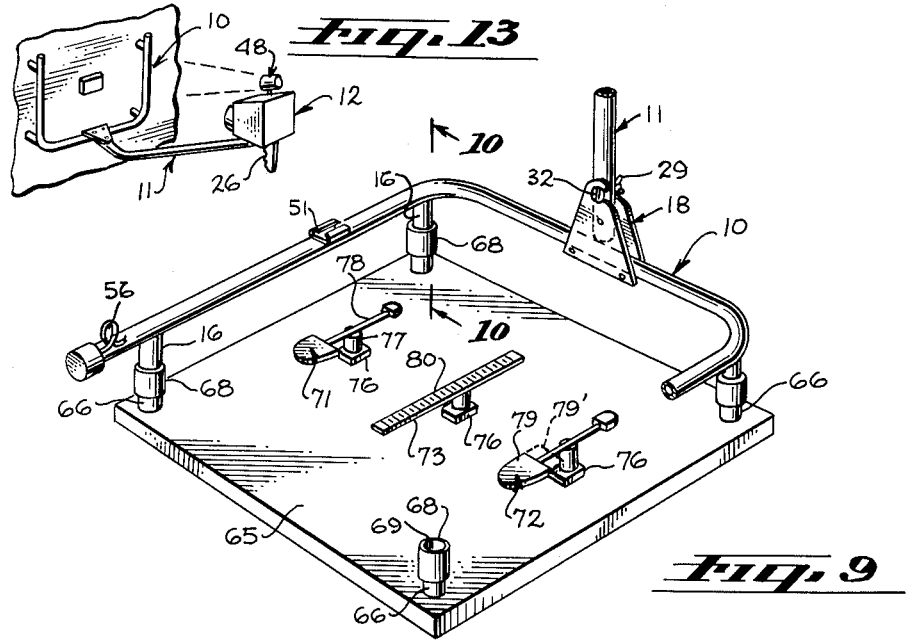
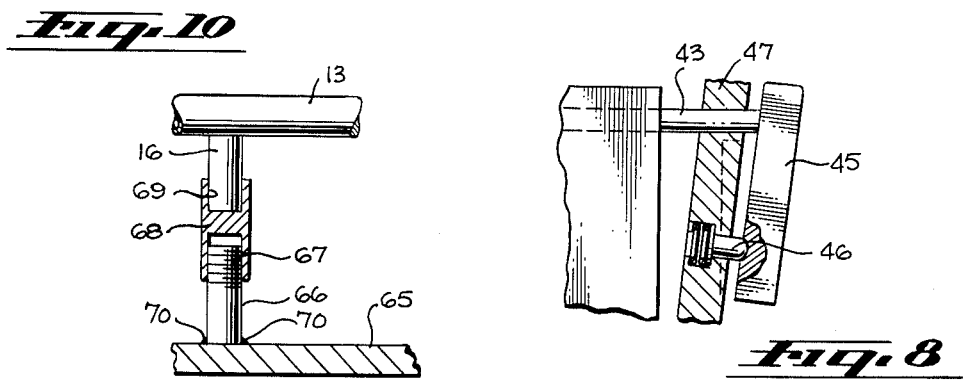
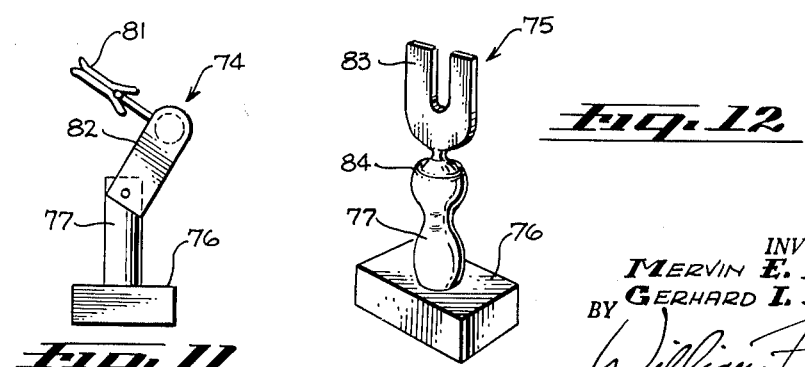
INVENTORS
MERVIN E. FULTON
GERHARD I. BAHNSEN
BY William P. Green
ATTORNEY United States Patent Office 3,228,283
Patented Jan. 11, 1966

3,228,283
CAMERA ASSEMBLY
Mervin E. Fulton, Tulare, Calif., and Gerhard I. Bahnsen, 2109 Parkway, Bakersfield, Calif.; said Fulton assignor to said Bahnsen
Filed July 11, 1961, Ser. No. 125,925
5 Claims. (Cl. 88—24)

This invention relates to an improved camera assembly which is in certain respects particularly adapted for use by law enforcement agencies in photographing various types of evidence.

In the past, it has been necessary for most law enforcement agencies to have available several different types of cameras, for use in photographing the various types of evidence which may be encountered. For instance, a first camera has usually been necessary for photographing scenes, large objects, and the like, while an entirely different type of camera has been required for photographing fingerprints and very small objects. These two cameras normally take different types of film, so that two types of film, and two sets of accessories, have usually been carried. In addition to these cameras, two others have normally been required at the office of the law enforcement agency, specifically a camera for copying documents, and another for taking "mug-shots." As will be apparent, this requirement for the use of several different cameras must necessarily be very expensive, and besides this, introduces complexity into the performance of the investigator's function, since he must understand the operation of all of the cameras, and all of their purposes.

A major object of the present invention is to provide a single camera which is adapted to serve the purposes of two or more of the above discussed conventional cameras, and preferably all of them. A camera embodying the invention may be carried from place-to-place very readily, and can be utilized at the scene of a crime to photograph any of the numerous types of on-the-scene evidence which may be encountered, including large objects and scenes, as well as fingerprints and other minute types of evidence. In addition, this same camera also may be utilized at the office of the investigative agency for copying documents, and for producing "mug-shots" of criminals. The camera is very easily convertible between its different photographic conditions, and inherently eliminates much of the photographic complexity which has heretofore been encountered by law enforcement agencies.

The above and other features and objects of the present invention will be better understood from the following detailed description of the typical embodiment illustrated in the accompanying drawings in which:

FIG. 1 is a perspective view showing a camera assembly constructed in accordance with the invention, as it appears when used for photographing a tire track;

FIG. 2 is an enlarged fragmentary vertical section taken on line 2—2 of FIG. 1;

FIG. 3 is a view showing the position to which the camera and its mounting column may be folded relative to the base;

FIG. 4 is a view showing the camera removed from its main support stand, and attached to a reduced dimension stand for photographing fingerprints and the like;

FIG. 5 is a rear view of the camera itself, with the housing partially broken away to show one of the swinging mask elements within the camera;

FIG. 6 is an enlarged section taken on line 6—6 of FIG. 1;

FIG. 7 is a fragmentary side view of the camera showing the manner in which it is attached to the supporting structure;

FIG. 8 is an enlarged fragmentary section taken on line 8—8 of FIG. 5;

FIG. 9 is a perspective view showing the larger camera stand mounted on a special detachable mounting plate, to which various types of evidence holding elements may be connected;

FIG. 10 is an enlarged fragmentary vertical section taken on line 10—10 of FIG. 9;

FIG. 11 is a side view of another type of evidence holder for the FIG. 9 bottom plate;

FIG. 12 is a perspective view of still another evidence holder;

FIG. 13 shows the manner in which the camera assembly of FIG. 1 may be held for photograping evidence on a wall or the like, or for photographing a person; and FIG. 14 is a view taken on line 14—14 of FIG. 2.

Referring first to FIG. 1, the camera assembly shown in that figure includes a base or frame portion 10, an upstanding support member or column 11, and a camera 12 mounted to the upper end of member 11. The base 10 may be formed of an elongated metal tube, deformed to the illustrated U-shaped horizontal cross-sectional configuration, to present two parallel horizontally extending arms 13 and 14 interconnected by a straight cross-piece 15 integral with and extending perpendicular to arms 13 and 14. The two arms 13 and 14 are desirably of the same length, so that elements 13, 14 and 15 form in effect a frame, defining within these elements a rectangular area which is the area photographed by camera 12 in the FIG. 1 position of the camera. At essentially the four corners of this rectangle defined by frame 10, the tube forming this frame rigidly carries four short downwardly projecting typically identical vertical legs 16, which may be circular in horizontal section, and which may rest on any desired horizontal support surface, such as a horizontal ground surface represented at 17. For engagement with this ground surface or other support surface 17, the legs 16 may have horizontal undersurfaces lying in a horizontal plane. Thus, the legs 16 support the frame 13–14–15 in a horizontal plane spaced slightly above surface 17 and parallel thereto.

The upwardly projecting support element 11 is pivotally attached to a bracket structure 18 which is secured in turn to the center of cross-piece 15 of frame or base 10. Bracket structure 18 may include two parallel vertical plates 19, rigidly secured by rivets 20 to the opposite sides of cross-piece 15. The upwardly projecting support member 11 may be formed of a rigid metal tube, which in the position of FIG. 1 has a vertically extending portion 21 whose lower end is received between plates 19. Above the vertical portion 21, member 11 extends angularly inwardly and upwardly at 22, at an inclination such as to position camera 12 directly above the center of the essentially rectangular area defined by bottom frame 13–14–15. The uppermost extremity of element 11 extends vertically at 23, and is a close fit within a downwardly facing cylindrical socket recess 24 formed in a member 25 attached to the back of the camera. The camera has a rearwardly projecting handle 26 secured to the part 25 into which the upper end of element 11 projects, so that the handle 26 may be utilized for lifting the camera upwardly away from element 11, to allow the camera to be handled independently of the support assembly.

The bottom vertical portion 21 of element 11 is pivotally connected to plates 19 by means of a rivet 27 (FIG. 2) for swinging movement about an axis 28 extending parallel to arms 13 and 14. More particularly, element 11 may swing about axis 28 between the upstanding position of FIG. 1, and a downwardly swung folded position represented in FIG. 3 (and in broken lines 11' in FIG. 1). In this retracted or folded position of element 11, this element lies in generally the same plane as bottom frame 13–14–15, with the camera also lying generally in that same plane, so that the entire unit may be transported easily as represented in FIG. 3. The element 11 and camera are adapted to be locked in the upstanding position of use represented in FIG. 1, by tightening of a wing-nut 29 on a bolt 30, which extends through lower portion 21 of element 11 parallel to the pivot pin 27. In the upper opened position of FIG. 1, the shank of bolt 30 is received within two identical locking notches 31 in plates 19, so that when the wing-nut 29 is then tightened relative to screw 30, the nut and the head 32 of bolt 30 tighten plates 19 against the opposite sides of element 11 in a manner positively locking that element in its upwardly projecting position.

Camera 12 may be essentially conventional in most respects, with the main viewing axis of the camera extending along the vertical line designated 33 in FIGS 1 and 5, when the camera is in its FIG. 1 position of use. The camera lens is represented at 34 in FIG. 5, and is controlled by a suitable setting mechanism, typically represented as a ring 35 disposed about a lens carrying and protecting tube 36. The shutter mechanism of the camera is represented diagrammatically at 37 in FIG. 5, and is actuable by conventional flexible operating element 38. At the upper end of camera 12, the camera housing carries a conventional structure 39 for receiving standard 4" x 5" film holders, or the like. FIG. 5 represents at 40 the position of a film plate which has been inserted into film receiving structure 39, with film 40 being disposed transversely of axis 33, and at a location such that an image formed by lens 34 falls on film 40. Lens actuating element 35 desirably has only three different settings, one of which sets the lens to a condition in which it focuses on film 40 an image of the essentially rectangular area outlined by base 10, with the plane of support surface 17 being in focus on the film. Lens 34 is of a sufficiently high f-stop number to allow the lens, in the discussed setting for FIG. 1, to also focus very sharply on film 40 articles slightly above surface 17, up to and slightly above the level of the horizontal plane of base 10, and also objects somewhat below the level of support surface 17. The other two settings of lens 34 are, first, a six foot to infinity setting taking the pictures at distances of six feet and greater, when camera 12 is removed from the stand of FIG. 1; and secondly, a very close focus setting to be utilized in conjunction with the scaled down base of FIG. 4, for taking pictures of fingerprints and the like.

In some cases it is desirable to photograph two halves of the area defined within the area of base 10 at different times, but on a single film. For this purpose, there are provided within the housing of camera 12 two hinged planar opaque mask elements 41 and 42, which are hinged or pivoted for individual swinging movement about two parallel axes or hinge pins 43 and 44. Each of these plates 41 and 42 covers one-half of the film 40 in an upwardly swung active masking position (see for example the illustrated active position of plate 42 in FIG. 5), but passes light to that portion of the film in a downwardly swung opened position (such as the position of mask 41 in FIG. 5). If it is desired to expose only the left half of film 40 in FIG. 5, then the masks 41 and 42 are actuated to the position illustrated in FIG. 5, and the camera shutter is then opened to take a picture. The masks are then reversed, so that element 41 blocks off the left half of the film, while element 42 exposes the right half, following which the shutter is again opened, to form an image on the second half of the film. When the film is then developed, it will show in side-by-side relation two separately taken half images, which may be compared to show the relationship between two different objects, or the same object at two different times. For actuating shutters 41 and 42 between their open and closed positions, there are provided at the outside of housing 112 of camera 12 two swinging handles 45, connected to hinge pins 43 and 44 respectively (see FIG. 8), and adapted to turn them. Hinge pins 43 and 44 are of course suitably journalled in the housing, as typically represented at 47 in FIG. 8. Associated with each of the handles 45, there may be provided two spring pressed or other detents 46, acting to releasably lock each handle 45 and the connected mask in open and closed conditions.

To indicate to a user the area covered in each setting of masks 41 and 42, there is desirably connected to base 10 a marker 54, typically taking the form of an elongated straight rod adapted to project from an inner one of the bracket plates 19 at a location midway between (and parallel to) base arms 13 and 14. This rod thus divides the photographed area within frame 10 into the two halves which are associated with masks 41 and 42 respectively. Rod 54 is mounted to plate 19, as by a universal connection 55 (FIG. 2), for swinging movement to a retracted position of extension alongside and parallel to crosspiece 15 of the frame (see broken line position 54' in FIG. 1) in which position rod 54 remains except when half size pictures are being taken.

In order that flash pictures may be taken under poor lighting conditions, the apparatus of FIG. 1 carries a flash unit 48, desirably an electronic flash containing its own batteries. Unit 48 has a handle portion 49, about which there may be connected a holder bracket 50, which is releasably connectible to a mating mounting bracket 51 secured to arm 13 of base 10. Brackets 50 and 51 (see FIGS. 1 and 6) may be of any conventional construction, and are typically represented as of a type in which element 50 has a tongue 52 slidably and removably receivable within a guide-way formed in a portion 53 of bracket 51. When the apparatus is being transported from place-to-place, bracket 50 is connected into bracket 51, in the position represented in FIGS. 1 and 6, so that the flash unit is tightly secured to the base. The interengagement of brackets 50 and 51 is either frictionally tight enough to retain the flash unit in position, or is supplemented by a suitable setscrew or the like for preventing accidental dislocation of the flash unit. When a picture is being taken, unit 48 is disconnected from bracket 51, and is either hand-held to illuminate the area defined within base 10, or is connected to another bracket 51a, which may be identical with bracket 51 but mounted to the side of camera 12. Bracket 51a may hold flash unit 48 in a position such that its axis is disposed at a slight angle to axis 33 of the camera, so that these axes meet at the center of the picture area defined by the frame 10.

In order to properly time the flash of unit 48 with the actuation of shutter 37, the flash unit is connected electrically to the shutter by means of an electrical cord having a coiled freely flexible and extensible portion 56 extending from unit 48 into the outer end of arm 13 of the base. This cord then extends through arm 13 and through cross-piece 15 of the base to a point 57, at which the cord extends at 58 from cross-piece 15 into vertical member 21, to extend upwardly through that vertical member to the camera. In FIG. 6, the cord within arm 13 is represented at 56'. At the upper end of member 11, the pin and socket connection 23–24 may be designed to include electrical contacts 123 which electrically connect the flash unit cord to the shutter mechanism for firing thereby, when the camera is connected to the upper end of element 12. The outer ends of arms 13 and 14 of the base may carry caps 59, one of which holds the cord 56 in fixed position relative to the base at the location of the cap. Flexible cord portion 56 is of course extensible to a long enough condition to permit flash unit 48 to be mounted to the side of camera 12 during the taking of a picture.

FIG. 4 represents at 60 a scaled-down essentially U-shaped base similar to that shown at 10 in FIG. 1, but considerably smaller for use in taking close-up photographs of fingerprints, bullets, small objects, and the like. Base 60 has an upstanding vertical member 61 projecting upwardly from its cross-piece 62, and to the upper end of which camera 12 is detachably mountable by reception of the upper end of member 61 within the socket 24 (FIG. 7). Small electric lights 63, controlled by individual on-off switches 163, may be mounted to the four corners of base or frame 60, and may be energized by batteries 64 for illuminating the area within frame 60 while a photograph is being taken. When unit 60 is in use, the lens is of course adjusted to its close-focus setting.

When somewhat larger objects are to be photographed, we employ in conjunction with the assembly of FIG. 1 a removable mounting plate 65, as seen in FIG. 9. This plate 65 is essentially planar, desirably being formed of sheet metal or steel having magnetic properties, so that the objects to be photographed may be retained on the upper surface of plate 65 magnetically. Plate 65 has essentially the same rectangular horizontal cross-sectional configuration as the photographed area defined by the U-shaped frame 10, except that plate 65 projects in all directions far enough to allow base 10 to rest on the plate. For supporting the base on the plate, plate 65 has at its four corners four upwardly projecting rigidly carried posts 66, having threads 67 at their upper ends, onto which four vertically extending socket elements 68 are threadedly connectible. These elements 68 have at their upper sides socket recesses 69 of cylindrical configuration, within which the legs or feet 16 of frame 10 are receivable to support base 10. Since elements 68 have threads engaging the threads 67 of members 66, the elements 68 are adjustable upwardly and downwardly in a manner effectively leveling frame 10 to any desired relation with respect to plate 65. Members 66 may be secured to plate 65 in any convenient manner, as by welding or brazing at 70.

In conjunction with plate 65, there are provided several different types of holders and other items 71, 72, 73, 74 (FIG. 11), and 75 (FIG. 12). Each of these units 71 through 75 has at its lower end a magnet 76 which is adapted to rest on the upper planar surface of plate 65, and be magnetically secured in fixed position relative thereto. Connected to this magnetic base 76, each element 71 through 75 has an upwardly projecting column portion 77, to which some type of holder or the like is secured. In the case of units 71 and 72, the upstanding post 77 carries at its upper end a shoe-holder structure 78, adapted to mount a shoe in inverted position on plate 65, for photographing the shape of the shoe, in order that foot prints may be compared therewith. This shoe holder may have a toe portion 79, which is adjustable relative to the rest of the holder to fit different sizes of shoes (see broken line position 79' in FIG. 9). The device 73 of FIG. 9 takes the form of a ruler 80 mounted in horizontally extending position to the upper end of its associated vertical element 77, so that the ruler may be photographed in any desired relation to a shoe, or any other object, for indicating the size thereof. The holder 74 of FIG. 11 takes the form of a spring clip 81, adapted to grip and hold any of numerous types of objects, and mounted by a universal joint 82 to column 77. The device of FIG. 12 includes a horseshoe magnet 83, secured by a universal joint 84 to the upper end of its associated column 77, for magnetically holding small objects on plate 65. Thus, these various types of holders permit the positioning of any of numerous types of objects on the upper surface of the mounting plate.

When the camera 12 is used separately from the stands 10 and 60, as for taking a photograph of a scene, the view to be photographed is indicated by any conventional type of view finder, such as the folding view finder represented at 84 in FIG. 1. When not in use, the two rectangular frame elements 85 and 86 of this view finder are folded to positions adjacent the side wall of the camera. When this view finder is to be used, on the other hand, the two elements swing outwardly to positions in which they indicate to a viewer the area being photographed.

To now briefly summarize the manner of use of the apparatus illustrated in the figures, assume first that it is desired to take a photograph of a tire track such as that shown at 87 in FIG. 1. The apparatus is then set up in the position of FIG. 1, with feet 16 of base 10 straddling the tire track to avoid any damage thereto by the apparatus. Rod 54 is normally swung to its broken line retracted position of FIG. 1, and flash unit 48 may be disconnected from bracket 51 and held by hand at a suitable angle to obliquely illuminate the tire track area. After the apparatus has been properly positioned, and film has been placed in the camera, the operator actuates element 38 to expose the film, and simultaneously fire the flash gun.

When it is desired to photograph any of the objects which may be held on plate 65, the base 10 is mounted on the plate as shown in FIG. 9, and the proper holder 71, 72, 74, or 75 is utilized for holding the object to be photographed in proper position, or in a desired relation to ruler 80. Flash unit 48 is usually fastened to bracket 51a on the camera when the camera is used in this way.

When it is desired to take a photograph of an object on a wall, or of a person's face for a "mug-shot," the entire apparatus of FIG. 11, including camera 12 and its holding structure, may be swung upwardly to the position represented in FIG. 13, in which U-shaped frame 10 is positioned to enclose the object or face to be photographed and to define the subject which will ultimately appear on the film. In this condition the camera and support structure are held in proper positions by means of handle 26. If, in any circumstances, it becomes desirable to make two successive half exposures of a film 40, then the rod 50 is swung into position to divide the viewing area into two equal halves, and the masks 41 and 42 are employed in the manner discussed previously to first expose one-half of the film, and then expose the other half. When extremely small objects are to be photographed at very close range, the camera is mounted on the scaled-down base of FIG. 4, and the lens is adjusted to its close-up position. When scenes or other objects are to be photographed separately from the base structures, camera 12 is removed from element 11, and utilized as an ordinary camera, with the lens adjusted to the third of its three different positions. For transportation, member 11 and its carried camera are swung to the retracted positions of FIG. 3, after loosening thumb-screw 29, so that the entire folding assembly may be carried easily and will occupy a minimum of space.

I claim:

1. An assembly comprising a generally U-shaped frame removably positionable above a support surface and lying generally in a predetermined plane to be spaced from and above said support surface, said U-shaped frame being adapted to extend only partially about and define a predetermined area to be photographed at which said support surface is visible through the frame from above, said U-shaped frame having two generally parallel arms extending along two opposite sides of said area, and a generally perpendicular cross piece extending along a third side of the area and connected at opposite ends to first ends of said arms, said frame being open at a fourth side of said area opposite said third side and between second ends of said arms, a structure carried by and extending generally upwardly from said frame, an essentially pivotal connection at a location closely adjacent said plane to the frame and attaching said upwardly extending structure to said cross piece of the frame to the rear of and spaced from said open side and near said plane of the frame and at a location approximately midway between said opposite ends of the cross piece, a camera carried by said structure at a location spaced above said frame, said camera being directed downwardly and positioned to photograph said support surface at said area through said frame, and short legs on said frame projecting downwardly from and beyond said plane of the frame to engage said surface and support the frame thereon but spaced apart to engage said surface at only spaced localized areas, said camera having a lens focused to maintain in focus on a film in the camera images of objects lying in said plane as well as objects spaced as low as the lower ends of said legs, and objects vertically between said plane and the lower ends of said legs.

2. An assembly as recited in claim 1, including a removable mounting plate receivable beneath said frame and said plane in a position of extension across said area to be photographed and having means connectible to said legs in a relation supporting the frame on said plate, and at least one holder connectible to said plate for holding an object at a location to be photographed.

3. An assembly as recited in claim 1, including a removable mounting plate of magnetic material receivable beneath said frame and said plane in a position of extension across said area to be photographed and having means connectible to said legs in a relation supporting the frame on said plate, and a holder for mounting an object to be photographed and having a portion magnetically attractible to said plate for detachably securing said holder thereto.

4. An assembly as recited in claim 1, including masking means in said camera for selectively masking either of two different portions of a film in the camera so that corresponding different portions of said area defined by the frame may be photographed at different times but on a single film, and partitioning means near said frame and visible therewith to a user of the camera and positioned to define to a user said two different portions of said area to be photographed on said two portions of the film respectively.

5. The combination as recited in claim 4, in which said partitioning means include an element for defining to a user the dividing line between said two different portions of said area to be photographed, and a connection mounting said element to said base for swinging movement between an active position of extension across said area and a retracted position at a side of said area.

References Cited by the Examiner

UNITED STATES PATENTS

| | | | |
|---|---|---|---|
| 1,748,687 | 2/1930 | Wade | 95—36 |
| 2,107,074 | 2/1938 | Hineline. | |
| 2,352,221 | 6/1944 | Phillips | 88—24 |
| 2,403,892 | 7/1946 | McFarlane et al. | 88—24 |
| 2,466,171 | 4/1949 | Hencke et al. | 88—24 |
| 2,505,990 | 5/1950 | Pollock. | |
| 2,664,038 | 12/1953 | Canham. | |
| 2,706,435 | 4/1955 | Gerken | 95—36 |
| 2,740,324 | 4/1956 | Cahill. | |
| 2,813,456 | 11/1957 | Ostrov | 88—24 |
| 2,942,537 | 6/1960 | Zimmerman | 95—1.1 |

FOREIGN PATENTS

| | | |
|---|---|---|
| 931,703 | 11/1947 | France. |
| 1,089,858 | 10/1954 | France. |

NORTON ANSHER, *Primary Examiner.*

EMIL G. ANDERSON, *Examiner.*